Patented Nov. 3, 1942

2,300,676

UNITED STATES PATENT OFFICE 2,300,676

N - (1 - CARBOXYACYLAMINOETHYLTHIO-METHYL) DERIVATIVES, AND THE PROCESS OF PRODUCING THEM

Morris S. Kharasch and Otto Reinmuth, Chicago, Ill., assignors to Eli Lilly and Company, Indianapolis, Ind., a corporation of Indiana No Drawing. Application June 3, 1940, Serial No. 338,657

13 Claims. (Cl. 260—295)

Our invention relates to certain new N-(1-carboxyacylaminoethylthiomethyl) derivatives of physiologically active primary and secondary amines, to their salts, and to the methods of producing them.

Our new products have been found to be generally of the same therapeutic effectiveness or physiological activity as the parent amines from which they are derived, and to be in general of markedly lower toxicity than the parent compounds. It is the markedly greater specific detoxifying effect of the 1-carboxy-1-acylamino-ethylthiomethyl group that distinguishes these new products from the other thiomethyl derivatives of physiologically active amines described in our co-pending application, Serial No. 338,656, filed June 3, 1940, and in our co-pending application Serial No. 305,926, filed November 24, 1939 on which United States Patent 2,224,156 was granted on December 10, 1940. In general the detoxifying effect of a 1-carboxy-1-acylamino ethylthiomethyl group is from three to five times that of any of the other thiomethyl groups described in our co-pending applications. In addition to the relatively low toxicity common to all our new derivatives, many of them are further useful in that their chemical and physical properties are more desirable in one or more respects than those of the parent compounds from which they are derived.

These new derivatives are substituted mono-amines which are derived from the class consisting of physiologically active primary and secondary amines and in which a hydrogen atom of the amino group is replaced by a radial which is represented by the following formula:

(1)

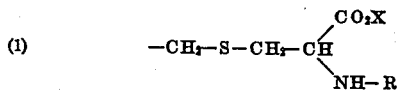

in which R' represents a member of the class of acyl groups consisting of those derived from the alkanoic and haloalkanoic acids of not more than eight carbon atoms, those derived from the aromatic and heterocyclic carboxylic acids and those derived from the aromatic sulfonic acids; and X represents a member of the class of positive ions consisting of hydrogen, the alkali metals, the normal equivalents of the alkaline earth metals, the nitrogen hydro-onium ions derived from ammonia, the alkylamines, the alkanolamines, and the polymethylene diamines.

By the term mono-amine, we mean an amino compound in which there is only one amino or substituted amino group; but this term mono-amine does not exclude the presence in addition to the amino group of an amido group or groups in which an $NH_2$ group or substituted $NH_2$ group is attached directly to an acyl group.

The mono-amines of our invention are represented by the following formula:

(2)

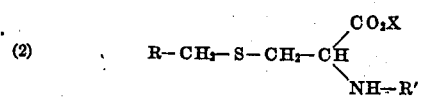

in which R' and X have the same meaning as heretofore noted and R represents the N-mono-dehydrogenated residue of a member of the class of mono-amines consisting of physiologically active primary and secondary amines. The N-monodehydrogenated residues in accordance with our invention include those derived from sulfanilamide and its derivatives [e. g.,

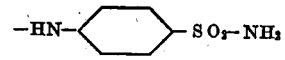

from sulfanilamide;

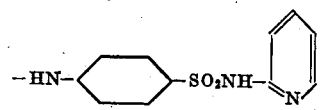

from sulfapyridine;

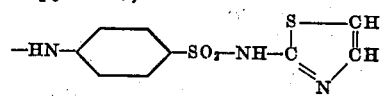

from sulfathiazole;

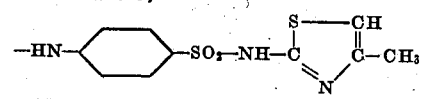

from methyl sulfathiazole;

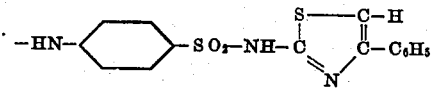

from phenyl sulfathiazole;

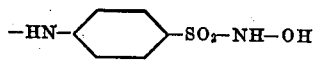

from sulfanilhydroxamide;

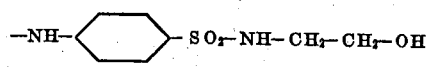

from sulfanilethanolamide;

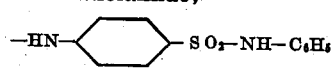

from sulfanilylanilide; and

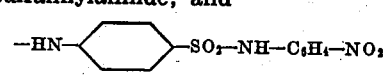

from sulfanilyl-p-nitroanilide];

those derived from the p-aminobenzoic esters [e. g.,

—HN—$C_6H_4$—$CO_2$—$C_2H_5$, from the free base of anesthesin;
—NH—$C_6H_4$—$CO_2$—$n$—$C_4H_9$, from the free base of butesin;
—HN—$C_6H_4$—$CO_2$—$CH_2$—$CH_2$—N=$(C_2H_5)_2$, from the free base of novocaine and
—HN—$C_6H_4$—$CO_2$—$CH_2$—$CH_2$—$CH_2$—N=$(n-C_4H_9)_2$, from the free base of butyn];

and those of other physiologically active primary and secondary amines derived for example from 4-aminoazobenzene, 4-amino-4'-methylazobenzene, 4-amino-4'-nitroazobenzene, histamine, tyramine, aminoantipyrine, proflavine, ephedrine alkaloid ($\alpha$-hydroxy-$\beta$-methylaminopropylbenzene), $\beta$-indolylethylamine, and epinephrine.

The salts are all freely soluble in water, and in general relatively stable in the solid state. The metallic salts are in general very slightly soluble in absolute alcohol, and insoluble in ether, benzene, and acetone. The ammonium and aminium salts are in general moderately soluble in absolute alcohol, but insoluble in ether, benzene, and acetone. The acids differ as to their solubility in water, and in general are less stable than are the salts.

The sodium salts are, in general, the most conveniently prepared, the most satisfactory in physical properties, and the most useful therapeutically. Of all of the N-acylcysteine derivatives investigated, we prefer the N-acetylcysteine.

In preparing our new products we proceed in general as follows:

To a solution or suspension of a physiologically active, primary or secondary amine having the general formula:

(3)     R—H in which R has the same significance as heretofore noted, in a suitable solvent, such as methyl alcohol, ethyl alcohol, ethylene glycol, propylene glycol, or dioxane, we add one molecular equivalent of an aqueous solution of formaldehyde, and one molecular equivalent of an N-acylcysteine of the general formula:

(4)     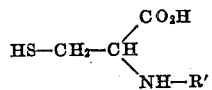

in which R' has the same meaning as heretofore noted.

It is desirable but not necessary to add the aldehyde before adding the N-acylcysteine. The N-acylcysteine may be added, and it is desirable to add it in moderate excess. The further addition of a relatively small amount of a strong, non-oxidizing acid, such as hydrochloric, sulfuric or phosphoric acids, (when the amine is not used in the form of an acid salt), though not imperative, facilitates and greatly expedites the reaction. The total concentration of the acid catalyst need not exceed 0.05%.

The formaldehyde and a primary monoamine may be combined to produce an intermediate product; and this intermediate product, separated as such if desired, although that is ordinarily not done, may be treated with the N-acylcysteine, at a later time and at a different place and in an entirely separate reaction if that is more convenient. But this gives the same final product.

The ingredients thus brought together react to produce an acid of the type shown in Formula 2, with X signifying hydrogen; but that acid is in solution. Since the free acids are in general less stable and less useful than their salts, it is not our usual practice to isolate the solid acid, although the acids may be isolated if desired.

If isolation of the acid is desired, some may be precipitated from solution by the addition of a relatively large volume of water. This precipitation may be facilitated by the addition of sodium chloride or other salting-out reagent. The solid acid thus obtained may be separated from the supernatant liquid in a suitable manner, as by filtration, decantation, or centrifugation. As thus obtained, it is an amorphous mass. This amorphous mass is washed with water and then dried as in a vacuum desiccator. To obtain the more water-soluble acids in solid form, we remove the solvent by evaporation, preferably at low temperature under reduced pressure. The usually syrupy or gummy acid so obtained is suitably dried, as in a vacuum desiccator.

Salts may be readily obtained from the solutions of the acid prepared as described, by addition of a solution in the same, or a mutually miscible, anhydrous solvent of the desired base, such as sodium hydroxide or ethoxide, calcium ethoxide, magnesium ethoxide, or by direct addition of ammonia or with the desired alkyl- or alkanolamine, or polymethylenediamine. In general the metallic salts so formed precipitate by reason of their relative insolubility in the solvent used. If precipitation does not occur, or is incomplete, it may be produced or brought to completion by adding dry ether or acetone.

In general the ammonium and aminium salts are relatively alcohol-soluble, but may be obtained in solid form by evaporation of the solvent and any excess of the base present, preferably at low temperature under reduced pressure. In some cases the salts may also be precipitated from solution by the addition of dry ether or acetone. The solid products so obtained are suitably dried, as in a vacuum desiccator.

Examples of the general process are as follows:

*Example 1.*—To 7.5 g. of $\alpha$-(p-aminobenzenesulfonylamido) pyridine (i. e., sulfapyridine) dissolved and suspended in 100 cc. of absolute ethyl alcohol, we add 4.5 cc. of formalin (36% formaldehyde), 5.5 g. of N-acetylcysteine (or the equivalent as calculated upon the basis of the percentage iodine reduction of the actual sample used), and 10 drops of 36% hydrochloric acid. (An equivalent amount of sulfuric or phosphoric acid or other strong non-oxidizing mineral acid may be used instead of hydrochloric acid.) The mixture is then shaken at room temperature until the solid material is completely dissolved, and water dilution and neutralization with sodium bicarbonate of a small test portion produce no precipitate of free amine. The acid thus formed in alcoholic solution is represented by the following formula:

(5) 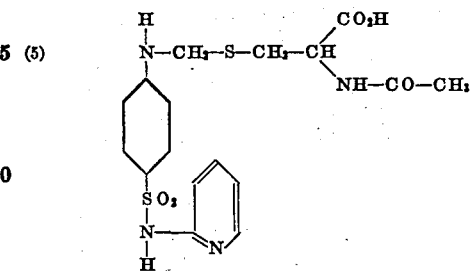

The acid represented in Formula 5 may be isolated in solid form if desired by evaporation of the solvent at low temperature under reduced pressure, and drying of the resulting residue in a vacuum desiccator over phosphorus pentoxide.

We prepare the sodium salt of the acid shown in Formula 5 by adding to the previously filtered and chilled alcoholic solution prepared as described, an alcoholic solution of sodium ethoxide, prepared by adding 2.5 g. of metallic sodium to 100 cc. of absolute ethyl alcohol. The sodium salt, being relatively insoluble in alcohol, precipitates and is collected by filtration, and dried in a vacuum desiccator.

This salt is represented by the formula:

(6) 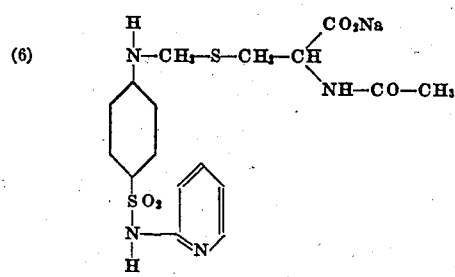

Example 2.—To 7.7 g. of 2-(p-aminobenzene-sulfonamido)-4-methylthiazole (i. e., methyl sulfathiazole) dissolved and suspended in absolute ethyl alcohol, we add 4.5 cc. of formalin (36% formaldehyde), 5.5 cc. of N-acetylcysteine and 10 drops of 36% hydrochloric acid. The mixture is shaken at room temperature until the solid material is completely dissolved, and water dilution and neutralization with sodium bicarbonate of a small test portion produces no precipitate of free amine.

The sodium salt is prepared in the same manner as described in Example 1. The sodium salt is represented by the following formula:

(7) 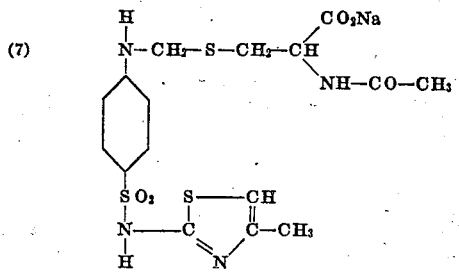

Example 3.—To 5.2 g. of p-aminobenzenesulfonylamide (i. e., sulfanilamide) dissolved and suspended in 100 cc. of absolute alcohol or other suitable solvent, such as dioxane, we add 4.5 cc. of formalin (36% formaldehyde), 5.5 g. of N-acetylcysteine and 10 drops of 36% hydrochloric acid and proceed in the manner described in Example 1 to produce the acid or the sodium salt of the acid. The sodium salt thus produced is represented by the following formula:

(8) 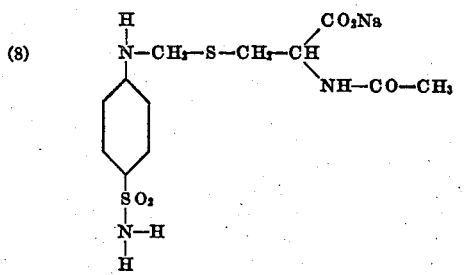

Example 4.—To 5.6 g. of p-aminobenzenesulfonylhydroxamide dissolved and suspended in 100 cc. of absolute alcohol, we add 4.5 cc. of formalin (36% formaldehyde), 5.5 g. of N-acetylcysteine and 10 drops of 36% hydrochloric acid and proceed in the manner described in Example 1 to produce the acid or the sodium salt of the acid. The sodium salt thus produced is represented by the following formula:

(9) 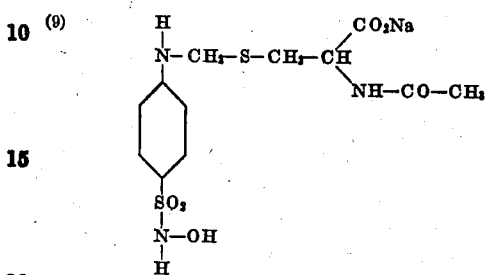

Example 5.—To 6.5 g. of p-aminobenzenesulfonylethanolamide dissolved and suspended in 100 cc. of absolute ethyl alcohol, we add 4.5 cc. of formalin (36% formaldehyde), 5.5 g. of N-acetylcysteine and 10 drops of 36% hydrochloric acid and proceed in the manner described in Example 1 to produce the acid or the sodium salt of the acid. The sodium salt thus produced is represented by the following formula:

(10) 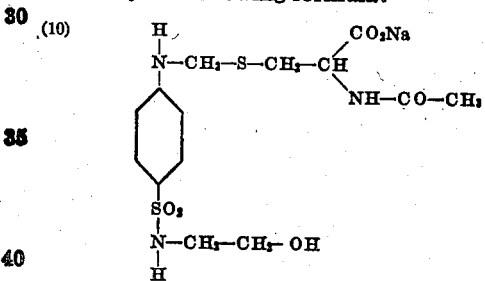

Example 6.—To 7.7 g. of 2-(p-aminobenzenesulfonylamido)thiazole (i. e., sulfathiazole) dissolved and suspended in 100 cc. of absolute ethyl alcohol, we add 4.5 cc. of formalin (36% formaldehyde), and 8.4 g. of N-β-bromopropionyl-cysteine (or equivalent as calculated upon the basis of the percentage iodine reduction of the actual sample used) and 7 drops of a 50% solution of phosphoric acid. We proceed in the manner described in Example 1 to produce the acid or the sodium salt of the acid. The sodium salt thus produced is represented by the following formula:

(11) 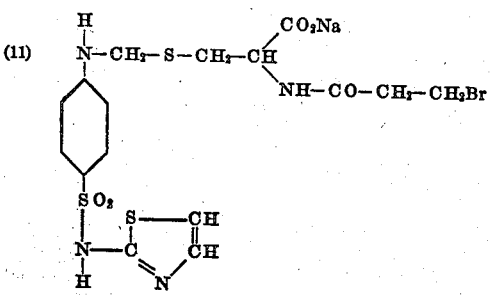

Example 7.—To 6.5 g. of p-aminobenzenesulfonylethanolamide dissolved and suspended in 100 cc. of absolute ethyl alcohol, we add 4.5 cc. of formalin (36% formaldehyde) and 7.5 g. of N-benzoylcysteine (or equivalent as calculated upon the basis of the percentage iodine reduction of the actual sample used) and 10 drops of 36% hydrochloric acid. We proceed in the manner described in Example 1 to produce the acid or the sodium salt of the acid. The acid thus produced is represented by the following formula:

(12) 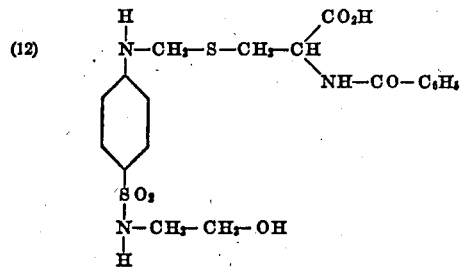

*Example 8.*—To 6.3 g. of 4-amino-4'-methylazobenzene dissolved and suspended in 100 cc. of absolute ethyl alcohol, we add 4.5 cc. of formalin (36% formaldehyde) and 7.5 g. of N-benzoylcysteine (or equivalent as calculated upon the basis of the percentage iodine reduction of the actual sample used) and 10 drops of 36% hydrochloric acid. We proceed in the manner described in Example 1 to produce the acid or the sodium salt of the acid. The sodium salt thus produced is represented by the following formula:

(13) 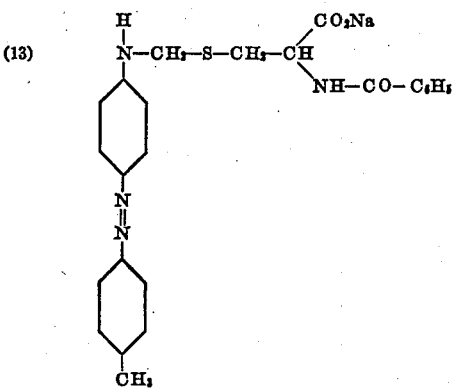

*Example 9.*—To 4.1 g. of p-phenetidine dissolved and suspended in 100 cc. of absolute ethyl alcohol, we add 4.5 cc. of formalin (36% formaldehyde) and 8.6 g. of N-benzenesulfonylcysteine (or equivalent as calculated upon the basis of the percentage iodine reduction of the actual sample used) and 10 drops of 36% hydrochloric acid. We proceed in the manner described in Example 1 to produce the acid or the sodium salt of the acid. The sodium salt thus produced is represented by the following formula:

(14) 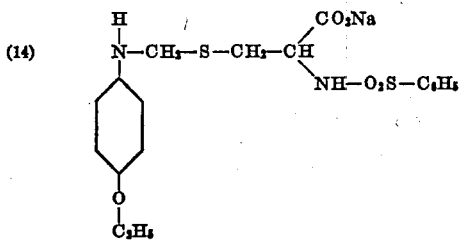

*Example 10.*—To 5.0 g. of ephedrine alkaloid (i. e., α-hydroxy-β-methylaminopropylbenzene) dissolved and suspended in 100 cc. of absolute ethyl alcohol, we add 4.5 cc. of formalin (36% formaldehyde) and 5.5 g. N.-acetylcysteine (or equivalent as calculated upon the basis of the percentage iodine reduction of the actual sample used) and 10 drops of 36% hydrochloric acid. We proceed in the manner described in Example 1 to produce the acid or the sodium salt of the acid. The sodium salt thus produced is represented by the following formula:

(15) 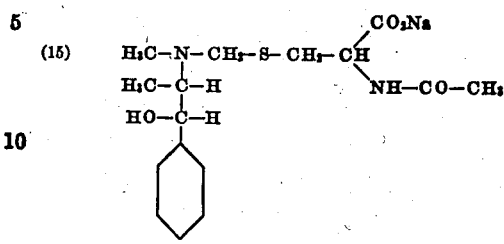

*Example 11.*—To 5.2 g. of uteramine (i. e., tyramine hydrochloride) dissolved and suspended in 100 cc. of absolute ethyl alcohol, we add 4.5 cc. of formalin (36% formaldehyde) and 5.5 g. of N-acetylcysteine (or equivalent as calculated upon the basis of the percentage iodine reduction of the actual sample used). In this case, no strong non-oxidizing mineral acid is employed as a catalyst since the acid salt of the mono-amine is employed. With that exception, the procedure is the same as that described in Example 1 for the production of the acid and the sodium salt of the acid. The sodium salt of the acid is represented by the following formula:

(16) 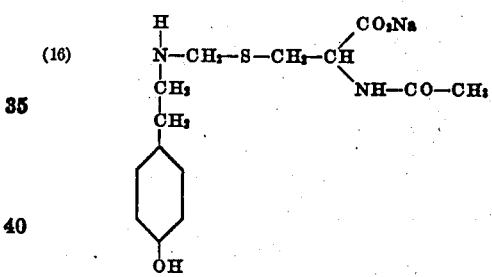

*Example 12.*—To 0.92 g. of histamine phosphate dissolved and suspended in 10 cc. of absolute ethyl alcohol, we add 0.45 cc. of formalin (36% formaldehyde) and 0.55 g. N-acetylcysteine (or equivalent as calculated upon the basis of the percentage iodine reduction of the actual sample used). In this case, no strong non-oxidizing mineral acid is employed as a catalyst since the acid salt of the mono-amine is employed. With that exception, the procedure is the same as that described in Example 1 for the production of the acid and the sodium salt of the acid. The sodium salt of the acid is represented by the following formula:

(17) 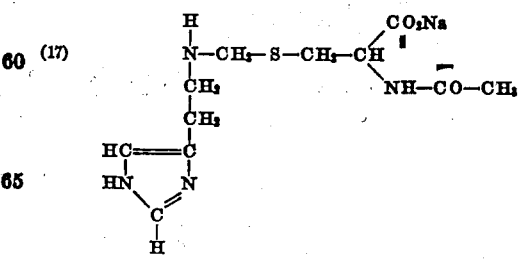

*Example 13.*—To 6.1 g. of aminoantipyrine dissolved and suspended in 100 cc. of absolute ethyl alcohol, we add 4.5 cc. of formalin (36% formaldehyde) and 5.5 g. N-acetylcysteine (or equivalent as calculated upon the basis of the percentage iodine reduction of the actual sample used) and 10 drops of 36% hydrochloric acid. We proceed in the manner described in Example 1 to produce the acid or the sodium salt of the acid. The sodium salt thus produced is represented by the following formula:

(18) 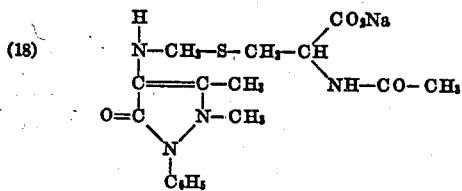

*Example 14.*—To 8.2 g. novocaine (i. e., procaine hydrochloride) dissolved and suspended in 100 cc. of absolute ethyl alcohol, we add 4.5 cc. of formalin (36% formaldehyde) and 5.5 g. N-acetylcysteine (or equivalent as calculated upon the basis of the percentage iodine reduction of the actual sample used) and 10 drops of 36% hydrochloric acid. We proceed in the manner described in Example 1 to produce the acid or the sodium salt of the acid. The sodium salt thus produced is represented by the following formula:

(19) 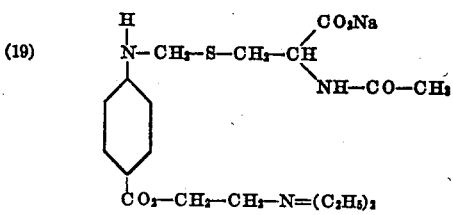

*Example 15.*—We prepare the calcium and magnesium salts of the derivatives described by adding the appropriate quantities of calcium ethoxide or magnesium ethoxide, respectively, dissolved in absolute ethyl alcohol to the alcoholic solutions of the respective acids prepared as described in Examples 1 to 14, inclusive. The salts, which precipitate by reason of their relative insolubility in alcohol, are collected by filtration, and dried in a vacuum desiccator. When precipitation is incomplete it is brought to completion by addition to the solution of a relatively large volume of dry acetone or ether, preferably the former.

*Example 16.*—We prepare the ammonium salts of the derivatives described by dissolving an excess of dry ammonia gas in the alcoholic solutions prepared as described in Examples 1 to 14, inclusive, with simultaneous cooling. The ammonium salts are obtained in solid form by evaporation of the solvent (and excess ammonia) at low temperature under reduced pressure, and by further drying of the amorphous, hygroscopic products so obtained in a vacuum desiccator.

We prepare the ethanolamine, diethanolamine, propanolamine, and isopropanolamine salts, and the ethylenediamine salt containing one molecule of diamine to one molecule of acid by adding slightly more than one molecular equivalent of the desired amine to the alcoholic solutions of the acid derivatives prepared as described in Examples 1 to 14, inclusive. In some cases the salts so formed may be precipitated from alcoholic solution by the addition of a relatively large volume of dry acetone or ether, preferably the former. Better yields are obtained, however, by proceeding as described for the ammonium salts above.

We prepare the ethylenediamine salt containing one molecule of diamine to two molecules of acid by adding one-half molecular equivalent of diamine to a solution of the desired acid derivative prepared as described in Examples 1 to 14, and then proceeding as described above. These diamine salts have in general the most satisfactory physical properties of all the amine salts.

In Examples 1 to 9, inclusive, and 14, the structures as indicated in Formulas 5 to 14, inclusive, and 19 show the physiologically active amine without any methylol group in the benzene nucleus. It is known that when an aromatic primary amine is treated with formaldehyde in acid solution some of the formaldehyde tends to condense with the aromatic ring to yield a methylol derivative. It is therefore possible that the products resulting from the practice of the methods described in Examples 1 to 9, inclusive, and 14 contain some of the methylol groups in the benzene ring. The precise amount of the methylol compounds in the reaction product of these examples has not been ascertained.

We claim as our invention:

1. An N-(1-carboxy-1-acylaminoethylthiomethyl) derivative of a p-aminobenzenesulfonamide, which is represented by the following formula:

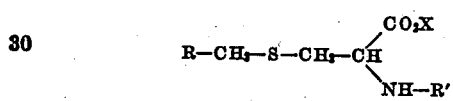

in which R represents the N-monodehydrogenated residue of a p-aminobenzenesulfonamide which is attached to the carbon atom to which R is linked through the 4-amino nitrogen atom; R' represents a member of the class of acyl groups consisting of those derived from the alkanoic and haloalkanoic acids of not more than eight carbon atoms, those derived from the aryl monocarboxylic acids, and those derived from the aryl monosulfonic acids; and X represents a member of the class of positive ions consisting of hydrogen, the alkali metals, the normal equivalents of the alkaline-earth metals, the nitrogen hydroonium ions derived from ammonia, the alkylamines, the alkanolamines, and the polymethylene diamines.

2. An N-(1-carboxy-1-acylaminoethylthiomethyl) derivative of a p-aminobenzenesulfonamide in accordance with claim 1, in which R' represents the acyl group derived from an alkanoic acid of not more than eight carbon atoms.

3. An N-(1-carboxy-1-acylaminoethylthiomethyl) derivative of a p-aminobenzenesulfonamide in accordance with claim 1, in which R' represents an acetyl group.

4. An N-(1-carboxy-1-acylaminoethylthiomethyl) derivative of a p-aminobenzenesulfonamide in accordance with claim 1, in which R' represents of the benzoyl group.

5. An N-(1-carboxy-1-acylaminoethylthiomethyl) derivative of a p-aminobenzenesulfonamide in accordance with claim 1, in which X represents sodium.

6. An N-(1-carboxy-1-acylaminoethylthiomethyl) derivative of a p-aminobenzenesulfonamide in accordance with claim 1, in which X represents hydrogen.

7. An N-(1-carboxy-1-acylaminoethylthiomethyl) derivative of a p-aminobenzenesulfonamide in accordance with claim 1, in which R' represents an acetyl group and X represents sodium.

8. A compound which is represented by the following formula:

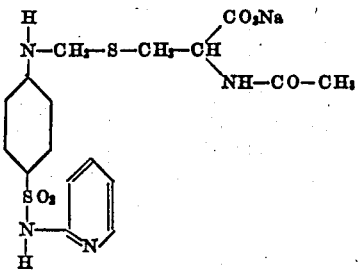

9. The process of producing a reaction product which consists in treating formaldehyde and a p-aminobenzenesulfonamide with an N-acylcysteine which is represented by the following formula:

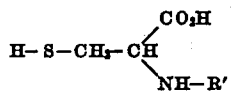

in which R' represents a member of the class of acyl groups consisting of those derived from alkanoic and haloalkanoic acids of not more than eight carbon atoms, those derived from the aryl monocarboxylic acids, and those derived from the aryl monosulfonic acids.

10. The process of producing a reaction product in accordance with claim 9, in which a non-oxidizing mineral acid is employed as a catalyst.

11. The process of producing a reaction product in accordance with claim 9, in which R' of the N-acylcysteine is derived from an alkanoic acid of not more than eight carbon atoms.

12. The process of producing a reaction product in accordance with claim 9, in which R' of the N-acylcysteine is derived from an aryl monocarboxylic acid.

13. The process of producing a reaction product in accordance with claim 9, in which R' of the N-acylcysteine is the acetyl radical.

MORRIS S. KHARASCH.
OTTO REINMUTH.